US008827712B2

(12) United States Patent
Mack

(10) Patent No.: US 8,827,712 B2
(45) Date of Patent: Sep. 9, 2014

(54) METHOD AND SYSTEM FOR NAME PRONUNCIATION GUIDE SERVICES

(75) Inventor: Bruce Mack, Ponte Vedra Beach, FL (US)

(73) Assignee: Max Value Solutions Intl., LLC, Ponte Vedra Beach, FL (US)

( * ) Notice: Subject to any disclaimer, the term of this patent is extended or adjusted under 35 U.S.C. 154(b) by 105 days.

(21) Appl. No.: 13/081,769

(22) Filed: Apr. 7, 2011

(65) Prior Publication Data

US 2011/0250570 A1 Oct. 13, 2011

Related U.S. Application Data

(60) Provisional application No. 61/321,653, filed on Apr. 7, 2010.

(51) Int. Cl.
*G09B 19/04* (2006.01)

(52) U.S. Cl.
CPC .................................... *G09B 19/04* (2013.01)
USPC .......................................................... 434/169

(58) Field of Classification Search
CPC .............................. H04L 67/306; G09B 19/04
USPC .......................................................... 434/169
See application file for complete search history.

(56) References Cited

U.S. PATENT DOCUMENTS

| | | | | |
|---|---|---|---|---|
| 5,794,249 | A * | 8/1998 | Orsolini et al. | 704/200 |
| 6,421,672 | B1 * | 7/2002 | McAllister et al. | 1/1 |
| 6,502,075 | B1 * | 12/2002 | Terry et al. | 704/275 |
| 6,810,113 | B1 * | 10/2004 | Bedingfield et al. | 379/88.18 |
| 7,457,397 | B1 * | 11/2008 | Saylor et al. | 379/88.17 |
| 2005/0084152 | A1 * | 4/2005 | McPeake et al. | 382/173 |
| 2006/0057545 | A1 * | 3/2006 | Mozer et al. | 434/156 |
| 2006/0171452 | A1 * | 8/2006 | Waehner | 375/240.01 |
| 2007/0005567 | A1 * | 1/2007 | Hermansen et al. | 707/3 |
| 2007/0297584 | A1 * | 12/2007 | Lalwani | 379/114.03 |
| 2008/0208574 | A1 * | 8/2008 | Chen et al. | 704/221 |
| 2008/0240382 | A1 * | 10/2008 | Fujita-Yuhas | 379/88.16 |
| 2009/0190728 | A1 * | 7/2009 | Bushnell et al. | 379/88.17 |

* cited by examiner

*Primary Examiner* — Sam Yao
*Assistant Examiner* — Thomas Hong
(74) *Attorney, Agent, or Firm* — Baker & Hostetler LLP

(57) ABSTRACT

A method for providing name pronunciation guides includes storing a plurality of audio files in a database, each audio file representing a particular pronunciation of one of a plurality of names, receiving user information from the first user via a communication network, the user information including name information of the first user, searching the database to find one or more audio files corresponding the name information, providing the first user with one or more audio files in the database corresponding to the name information via the communication network for the first user's listening and selection, creating a user profile for the first user, the user profile comprising the user information and the selected audio file, and storing the user profile in the database.

22 Claims, 16 Drawing Sheets

530

| Picture | Name | Member ID | Company Name | Language | Country | Work Country | Work State | Work City | Home Country |
|---|---|---|---|---|---|---|---|---|---|
| | Alicia Cunningham | Alicia_Cunningham_w20ab | Snow Owl | English | USA | USA | Georgia | Woodstock | USA |
| | Alicia Cunningham | Alicia_Cunningham | Max Value | English | USA | USA | Georgia | Woodstock | USA |
| | Alicia Cunningham | Alicia_Cunningham_iaabc | | English | USA | USA | Georgia | Woodstock | USA |
| | Alicia Cunningham | Alicia_Cunningham_10101 | acme motors | English | USA | USA | Florida | PONTE VEDRA BEACH | USA |
| | Alicia Cunningham | Alicia_Cunningham_ye5ab | | English | USA | USA | Georgia | Woodstock | USA |
| | Alicia Cunningham | Alicia_Cunningham_86abc | Snow Owl | English | USA | USA | Georgia | Woodstock | USA |

| My Profile | More About Me |
|---|---|
| **Current Position** | |
| Company Name | Snow Owl |
| Company Title | |
| Company Address | |
| City | |
| State | |
| Country | |
| Zip | |
| Business Phone Number | |
| Direct Line | |
| Company Cell | |
| Company Email | |
| Company Website | |

390B — 392A (My Profile) — 392B (More About Me)

530

Search for Names or a Person:

Alicia Cunningham | Search

Advanced Search for Names    Advanced Search for People

| Picture | Name | Member ID | Company Name | Language | Country | Work Country | Work State | Work City | Home Country |
|---|---|---|---|---|---|---|---|---|---|
| 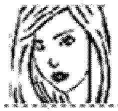 | Alicia Cunningham | Alicia_Cunningham_w20ab | Snow Owl | English | USA | USA | Georgia | Woodstock | USA |
| 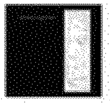 | Alicia Cunningham | Alicia_Cunningham | Max Value | English | USA | USA | Georgia | Woodstock | USA |
| | Alicia Cunningham | Alicia_Cunningham_iaabc | | English | USA | USA | Georgia | Woodstock | USA |
| | Alicia Cunningham | Alicia_Cunningham_10101 | acme motors | English | USA | USA | Florida | PONTE VEDRA BEACH | USA |
| | Alicia Cunningham | Alicia_Cunningham_ye5ab | | English | USA | USA | Georgia | Woodstock | USA |
| | Alicia Cunningham | Alicia_Cunningham_86abc | Snow Owl | English | USA | USA | Georgia | Woodstock | USA |

Search for Names or a Person:

Alicia | Search

Advanced Search for Names    Advanced Search for People

| Picture | Name | Member ID | Company Name | Language | Country | Work Country | Work State | Work City | Home Country |
|---|---|---|---|---|---|---|---|---|---|
| | Alicia | Alicia_Cunningham_iaabc | | English | USA | USA | Georgia | Woodstock | USA |
| | Alicia | sid_badjatiya | | English | USA | USA | New Jersey | Jersey City | India |
| | Alicia | Alicia_Cunningham_10101 | acme motors | English | USA | USA | Florida | PONTE VEDRA BEACH | USA |
| | Alicia | Alicia_Cunningham_ye5ab | | English | USA | USA | Georgia | Woodstock | USA |
| | Alicia | Alicia_Cunningham_86abc | Snow Owl | English | USA | USA | Georgia | Woodstock | USA |
| | Alicia | Alicia_Cunningham_35zab | mCguirewoods | English | USA | USA | Virginia | Arlington | USA |
| 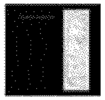 | Alicia | Alicia_Cunningham | Max Value | English | USA | USA | Georgia | Woodstock | USA |

| Name | Language | Country | Normal | Slow | Practice | Advice | Additional Advice | Gender | Type |
|---|---|---|---|---|---|---|---|---|---|
| Alicia | English | USA | Play | Play | Practice | uh-LEE-shuh | None | Female | Given Name |
| Alicia | Spanish | USA | Play | Play | Practice | uh-LEE-see-uh | None | Female | Given Name |
| Alicia | English | USA | Play | Play | Practice | uh-LEE-shuh | None | Female | Given Name |
| Alicia | English | USA | Play | Play | Practice | uh-LEE-see-uh | None | Female | Given Name |
| Alicia | English | USA | Play | Play | Practice | uh-LISH-uh | None | Female | Given Name |
| Alicia | English | USA | Play | Play | Practice | uh-LISS-ee-uh | None | Female | Given Name |

*Fig. 5E*

METHOD AND SYSTEM FOR NAME PRONUNCIATION GUIDE SERVICES

CROSS REFERENCE TO PRIOR APPLICATIONS

This application claims the benefit from U.S. Provisional Application No. 61/321,653 filed on Apr. 7, 2010, which is hereby incorporated by reference for all purposes as if fully set forth herein.

BACKGROUND OF THE DISCLOSURE

1. Field of the Disclosure

This disclosure is directed to a method and system for name pronunciation guide services, and, particularly to guiding individuals and organizations to learn how to call people what they want to be called.

2. Related Art

There currently does not exist any system or method to provide services designed to help people pronounce another person's name the way that person wants it pronounced. There are a few websites dedicated to helping pronounce names or words where one can hear a recording of a name being pronounced. However, there are many limitations, such as, e.g., limited availability of pronounced names, incorrect and/or poor pronunciations, questionable quality of recordings and lack of advice or guidance on how to pronounce names, and/or the like. Very few sites provide written advice for how to pronounce a name, but no website provides any tools to practice name pronunciations.

Accordingly, there is a need for a method and system that can provide name pronunciation guides to help people say another person's name the way that person wants it said.

SUMMARY OF THE DISCLOSURE

According to an aspect of the disclosure, a method for providing name pronunciation guide includes storing a plurality of audio files in a database, each audio file representing a particular pronunciation of one of a plurality of names, receiving user information from a first user via a communication network, the user information including name information of the first user, searching the database to find one or more audio files corresponding the name information, providing the first user with one or more audio files in the database corresponding to the name information via the communication network for the first user's listening and selection, creating a user profile for the first user, the user profile including the user information and the selected audio file, and storing the user profile in the database.

The user information may further include at least one of basic information, address information, hometown information and birthplace information, wherein the basic information may include at least one of an email address, a primary language and other languages spoken by the first user, wherein the address information may include at least one of a street address, a city, a state/providence, a zip/postal code and a country, wherein the hometown information may include at least one of a country, a state/providence and a city, and wherein the birthplace information may include a country.

The name information may include one or more call-me-this names including at least one of a formal written name, a formal spoken name and an informal spoken name. The name information may further include at least one of a gender, a date of birth, a title, a middle name, a suffix and one or more do-not-call-me names.

The method may further include storing, in the database, at least one of a normal speed audio file and a slow speed audio file representing a particular pronunciation of at least some of the plurality of names. The method may further include storing, in the database, at least one of pronunciation advice information, an International Phonetic Alphabet (IPA) transcription, language information and accent information of at least some of the plurality of audio files.

The method may further include receiving one or more user audio files representing a particular pronunciation of the first user's name from the first user when the particular pronunciation of the first user's name is not available in the database. The one or more user audio files may include at least one of a normal speed audio file and a slow speed audio file for at least one of the call-me-this names.

The method may further include publishing the user profile of the first user on a searchable location of the communication network, and the published user profile may include at least one of: at least one of the normal speed audio file and the slow speed audio file of at least one of the call-me-this names of the first user, the do-not-call-me name of the first user; and the language spoken by the first user.

The method may further include receiving an inquiry for searching a name from a second user via the communication network, searching the database to find one or more audio files corresponding to the searched name; and providing to the second user one or more audio files corresponding to the searched name via the communication network.

The method may further include receiving a practice audio file from the second user via the communication network, the practice audio file representing the second user's pronunciation of the searched name, analyzing the practice audio file to determine whether the second user's pronunciation of the searched name is correct or not; and providing a feedback to the second user as to whether the second user's pronunciation of the searched name is correct or not via the communication network.

According to another aspect of the disclosure, a name pronunciation guide system includes a server connected to a communication network and operating a database storing a plurality of audio files, each audio file representing a particular pronunciation of one of a plurality of names, and a first user device connected to the server via the communication network and configured to receive a user information from a first user and send the user information to the server, the user information including name information of the first user. In response to the user information received from the first user device, the server is configured to search the database to find one or more audio files corresponding the name information, send one or more audio files corresponding to the name information to the first user device via the communication network for the first user's listening and selection, creating a user profile for the first user and store the user profile in the database, the user profile including the user information and the selected audio file.

The user information may further include at least one of basic information, address information, hometown information and birthplace information, wherein the basic information may include at least one of an email address, a primary language and other languages spoken by the first user, wherein the address information may include at least one of a street address, a city, a state/providence, a zip/postal code and a country, wherein the hometown information may include at least one of a country, a state/providence and a city, and wherein the birthplace information may include a country.

The name information may include one or more call-me-this names including at least one of a formal written name, a formal spoken name and an informal spoken name of the first user, wherein the name information may further include at least one of a gender, a date of birth, a title, a middle name, a suffix and one or more do-not-call-me names.

The database may include at least one of a normal speed audio file and a slow speed audio file representing a particular pronunciation of at least some of the plurality of names, and at least one of pronunciation advice information, an international phonetic alphabet (IPA) transcription, language information and accent information of a particular pronunciation of at least some of the plurality of names.

The server may be further configured to receive one or more user audio files representing a pronunciation by the first user of the first user's name from the first user device when the particular pronunciation of the first user's name is not available in the database.

The user profile of the first user may be published on a searchable location of the communication network, the published user profile including at least one of: at least one of the normal speed audio file and the slow speed audio file of at least one of the call-Me-this names of the first user; the do-not-call-me name of the first user; and the language spoken by the first user.

The server may be further configured to receive an inquiry for searching a name from a second user device of a second user via the communication network, search the database to find one or more audio files corresponding to the searched name, and send one or more audio files corresponding to the searched name to the second user device via the communication network.

The server may be further configured to receive a practice audio file from the second user device via the communication network, the practice audio file representing the second user's pronunciation of the searched name, analyze the practice audio file to determine whether the second user's pronunciation of the searched name is correct or not, and provide a feedback to the second user device as to whether the second user's pronunciation of the searched name is correct or not via the communication network.

The first user device and the second user device may be one of a desktop computer, a laptop computer, a tablet computer, a personal data assistant (PDA) and a mobile phone.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 5C shows an image of a people search result page of the website of FIG. 3A constructed according to the principles of the disclosure.

FIG. 5D shows an image of another people search result page of the website of FIG. 3A constructed according to the principles of the disclosure.

FIG. 5E shows an image of a name search result page of the website of FIG. 3A constructed according to the principle of the disclosure.

DETAILED DESCRIPTION OF THE DISCLOSURE

Figure 1:
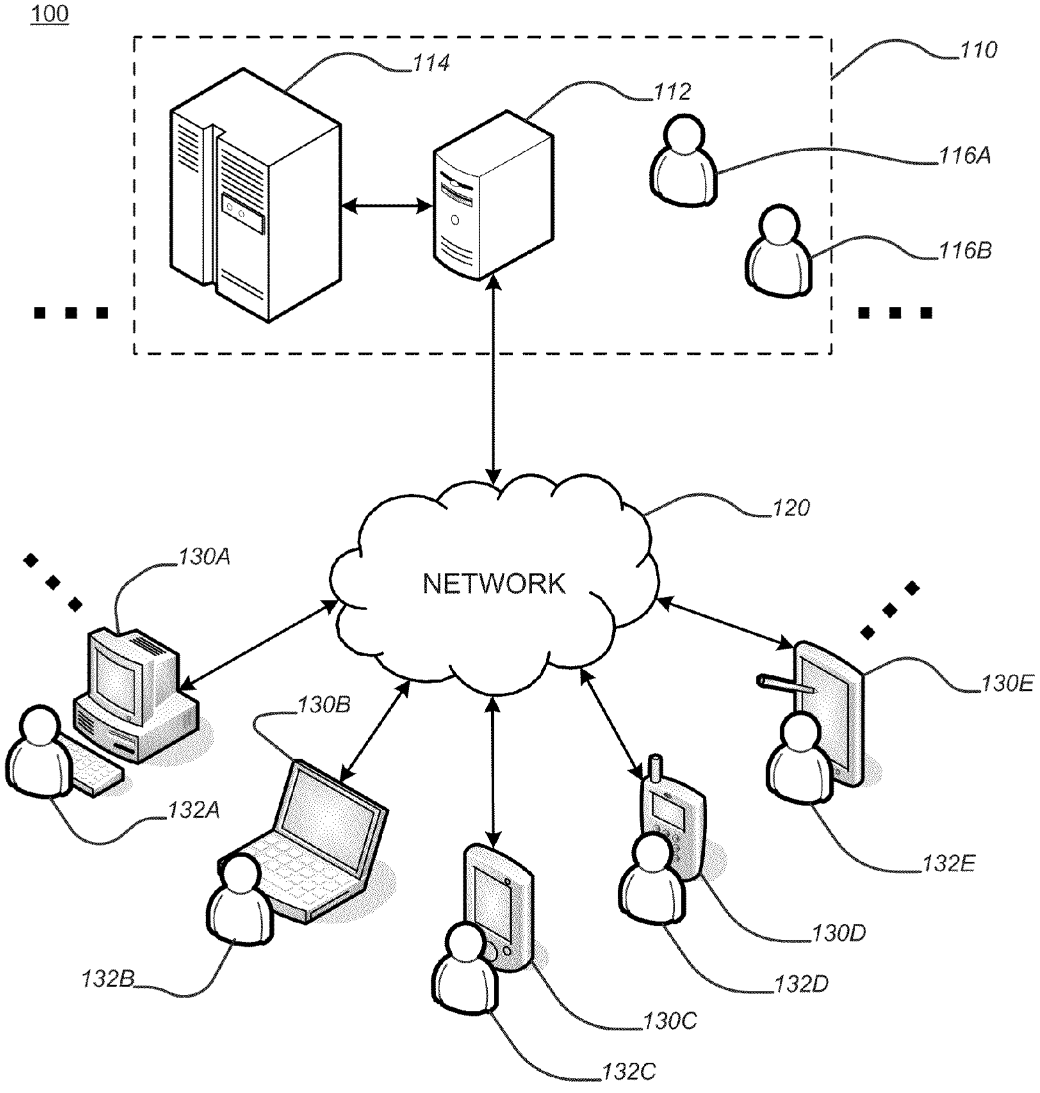
FIG. 1 shows an overview of a system for providing name pronunciation guide services constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

FIG. 1 shows an overview of a system 100 for providing name pronunciation guide services constructed according to the principles of the disclosure. The system 100 may include a service provider 110 that is connected to a plurality of user devices 130 via a communication network 120. The service provider 110 may include a server 112, a storage 114 and/or the like. The storage 114 may store a database, which may be connected to and managed and operated by the server 112. The storage 114 may be any type of data storage devices available in the market. The storage 114 may be a single data storage device or a combination of two or more data storage devices that may be located in the same place or located in different places. The storage 114 may contain a plurality of names (e.g., first names, middle names, last names), a plurality of sound clips (i.e., audio files) and/or the like, which may be indexed in the database for search and retrieval. Each sound clip may contain a particular pronunciation of a name in the database. There are certain names that may be pronounced in more than one way. For example, the name "Alicia" may be pronounced as "uh-LEE-shuh," "uh-Lee-see-uh," "uh-LEE-shuh," "uh-LISH-uh" or the like. Thus, there may be more than one sound clip associated to a particular name. Each sound clip may be recorded professionally by, e.g., voice actors and/or the like. However, since it may be impossible to obtain all the names and their pronunciations, the service provider 110 may be configured to receive and store names and their sound clips from external sources, such as, e.g., domestic and international users, other database, and/or the like, and index and store the names and sound clips in the database 114.

The server 110 may be any type of computing devices available in the market. The server 110 may be a single computing device or a combination of two or more computing devices. The server 110 may be located at the same place as the storage 114 or may be located in a different place but connected to the storage 114 via the communication network 120. The service provider 110 may be administered by one or more operators 116A and 116B. However, the service provider 110 may be configured to automatically carry out the name pronunciation guide services without any input from the operators 116A and 116B.

The communication network 120 may be any type of electronic communications networks, such as, e.g., a local area network (LAN), a personal area network (PAN), a home area network (HAN), a wide are network (WAN), a campus network, a metropolitan network, an enterprise private network, a virtual private network, an internetwork, a backbone network (BBN), a global area network (GAN), the Internet, an intranet, an extranet, an overlay network and/or the like and/or a combination of two or more thereof. The user devices 130 may communicate with the service provider 110 from anywhere and anytime via the communication network 120.

The user devices 130 may be any type of computing devices, such as, e.g., a desktop computer 130A, a laptop/mobile computer 130B, a personal data assistant (PDA) 130C, a mobile phone 130D, a tablet computer 130E and the like, with wired/wireless communications capabilities via the communication network 120. Each user device 130 may include a user interface, such as, e.g., a screen, a keyboard/touch pad, a speaker/headphone, a microphone and/or the like (not shown), which may be internal to the user device 130 or externally connected thereto. For example, the mobile phone 130D may include a screen, a keyboard/touchpad, a microphone and a speaker internally. For the desktop computer 130A, an external microphone may be connected to an audio/microphone-in terminal thereof.

Using the user devices 130, users 132, such as, e.g., the first user 132A using the desktop 130A, the second user 132B using the laptop 130B, the third user 132C using the PDA 130C, the fourth user 132D using the mobile phone 130D, the fifth user 132E using the tablet computer 130E and/or the like, may access the name pronunciation guide services anytime regardless of their geographic locations, languages and/or the like, which is explained below in detail. The users 132 may provide their name information and name pronunciation information with other information, such as, e.g., user information and/or the like. Furthermore, the users 132 may create sound clips of their names using their user devices 130 as known in the art. For example, the user 132D may use the mobile phone 130D to record his or her name in his or her own voice or someone else's voice to create a sound clip, which may be sent to the service provider 110 via the network 120 with additional information necessary for indexing and storing the sound clip in the storage 114.

In an embodiment, the name pronunciation guide services may be web-based. For example, the server 112 may operate a web application to carry out the name pronunciation guide services, which may be accessed by the user devices 130 via the network 120. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like) and/or the like such that any user devices 130 running a common web browser (e.g., Internet Explorer™, Firefox™, Chrome™ or the like) may render the application executable. Additionally or alternatively, client software may be installed in each of the user devices 130 locally to access the name pronunciation guide services hosted by the service provider 110. However, the web-based service may be more beneficial due to the ubiquity of web browsers and the convenience of using a web browser as a client (i.e., thin client). Further, with inherent support for cross-platform compatibility, the web application may be maintained and updated without distributing and installing software on potentially a large number of the user devices 130.

The user 132 may access the name pronunciation guide services simply by visiting a website hosted or operated by the service provider 110 where the user 132 searches the database for a name and to learn a correct pronunciation of the name, and search a person and learn how to pronounce the person's name. Further, the user 132 may provide a pronunciation of his or her name to the service provider 110 such that other people can search the user 132 to see the user's profile and learn how to pronounce his or her name.

Figure 2:
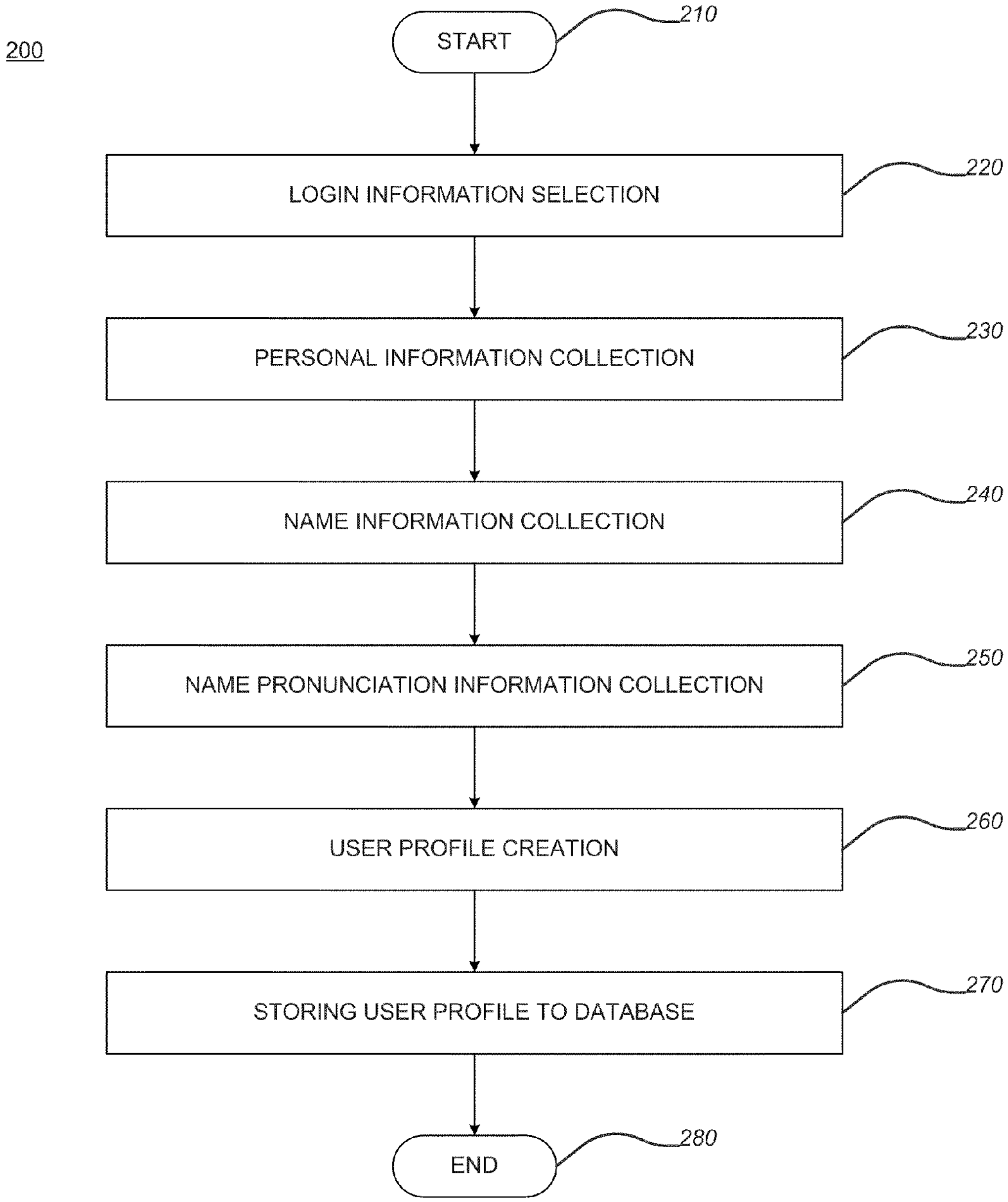
FIG. 2 shows a flowchart of a process for registering a user to name pronunciation guide services according to the principles of the disclosure.

FIG. 2 shows a flowchart of a method 200 for registering a user to the name pronunciation guide services according to the principles of the disclosure. The method 200 may be web-based and carried out using the system 100 shown in FIG. 1 and/or the like. The process 200 may start (at 210) when the user 132 accesses a website for the name pronunciation guide services for registration using her or his user device 130. The user 132 and the service provider 110 then may go through a login information selection process (at 220), in which the user 132 may select a login name and a password to access the website, as known in the art. The login information may then be collected by the service provider 110 and stored in the storage 114. Subsequently, the service provider 110 may collect personal information (at 230) and name information (at 240) from the user 132, which are further described below in detail, for example, in FIGS. 3C, 3D, 3E and 3H. Further, the service provider 100 may collect name pronunciation information (at 250) from the user 132. For example, the user 132 may listen to one or more sounds clips provided by the service provider 110 and select one as a correct pronunciation of her or his name, or, alternatively, the user 132 may record his or her name with his or her own voice or someone else's and send a sound clip of the recorded voice to the service provider 110. The name pronunciation information collection process 250 is also further described below in detail, for example, in FIGS. 3F and 3G.

Based on the collected login information (at 220), personal information (at 230), name information (at 240), name pronunciation information (250) and/or the like, a user profile may be created (at 260) for the user 132. The user profile may be stored in the database 114 (at 270) and the process 200 may be terminated (at 280). The user profile may be created even if the user 132 does not complete the process 200 entirely. For example, the user may skip the personal information collection step 230 or complete only the login information selection process 220 and the name information collection process 240. Any uncompleted steps may be completed any time by logging into his or her account later on.

Figure 3A:
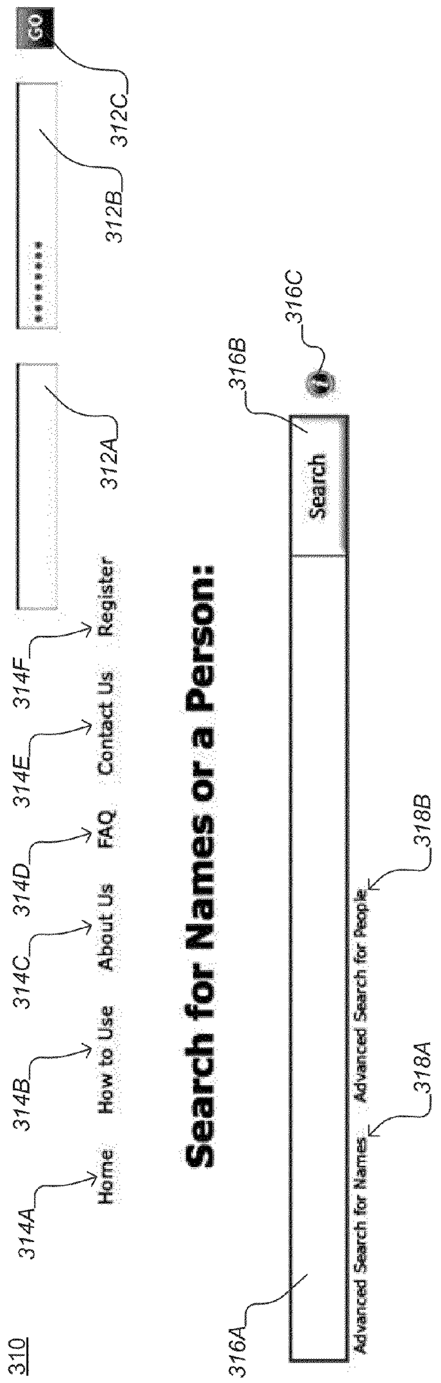
FIG. 3A shows an image of a home page of a website for providing the name pronunciation guide services constructed according to the principles of the disclosure.
Figure 3B:
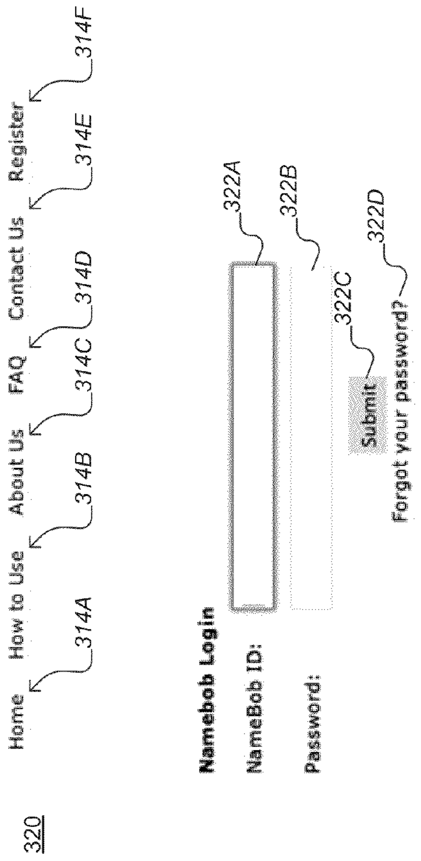
FIG. 3B shows an image of a member login page of the website of FIG. 3A constructed according to the principles of the disclosure.

FIG. 3A shows an image of a home page 310 of a website for providing the name pronunciation guide services constructed according to the principles of the disclosure. The home page 310 may include text blocks 312A and 312B for entering a user name and a password, respectively, and a "Go" button 312 for logging into the website. The home page 310 may further include a plurality of links to other related web pages, such as, e.g., top level links 314 and/or the like. The top level links 314 may include a "Home" link 314A, a "How to Use" link 314B, an "About Us" link 314C, an "FAQ" link 314D, a "Contact Us" link 314E, a "Register" link 314F and/or the like. By default, the top level links 314 may be shown at the top of each and every web page of the web site for easier navigation to other web pages as known in the art. The home page 310 may further include a text block 316A and a "Search" button 316B for searching a particular pronunciation of a name, a particular person among the registered members, listening to and/or practice the search names and/or the like. Additional search links, such as, e.g., an "Advanced Search for Names" link 318A, an "Advanced Search for People" link 318B and/or the like may be further provided to carry out more advanced searches, which is described below in detail with reference to FIGS. 5A, 5B, 5C, 5D and 5E. Additionally or alternatively, the website may include a member login page 310 shown in FIG. 3B, where a registered member can type his or her login name and password in text blocks 322A and 322B, respectively, and click a "Submit" button 322C, to access the website. The website 310 may also include a "Forgot your password?" link 322D, which may be linked to another web page (not shown) where a registered member may retrieve a forgotten password after one or more identification checking steps as known in the art.

While anyone connected to the network 120 may access the website to search a name and/or a person in the database 114 and learn and practice how to pronounce names, one may benefit from registering to the website and provide his or her user information along with name pronunciation information because, once a registered user's user information and name pronunciation guides are provided to the service provider 110 and stored in the database, anyone connected to the network 120 may be able to search the registered user information and learn and practice how to pronounce her or his name in the way the registered user wants. For example, when the user 132 click the "Register" link 314F in the home page 310 shown in FIG. 3A for registration, a registration page 330 (shown in FIGS. 3C, 3D, 3E, 3F, 3G and 3H) may be displayed on the user device 130, in which the user 132 may enter his or her user information, name pronunciation information and/or the like. For example, as shown in FIGS. 3C, 3D, 3E, 3F, 3G and 3H, the registration page 330 may include a plurality of tabs 332, such as, e.g., "About Me" tab 332A, "My Names" tab 332B, "Call Me This" tab 332C, "Say It Like This" tab 332D, "Record My Voice" tab 332E, "More About Me" tab 332F and/or the like.

Figure 3C:
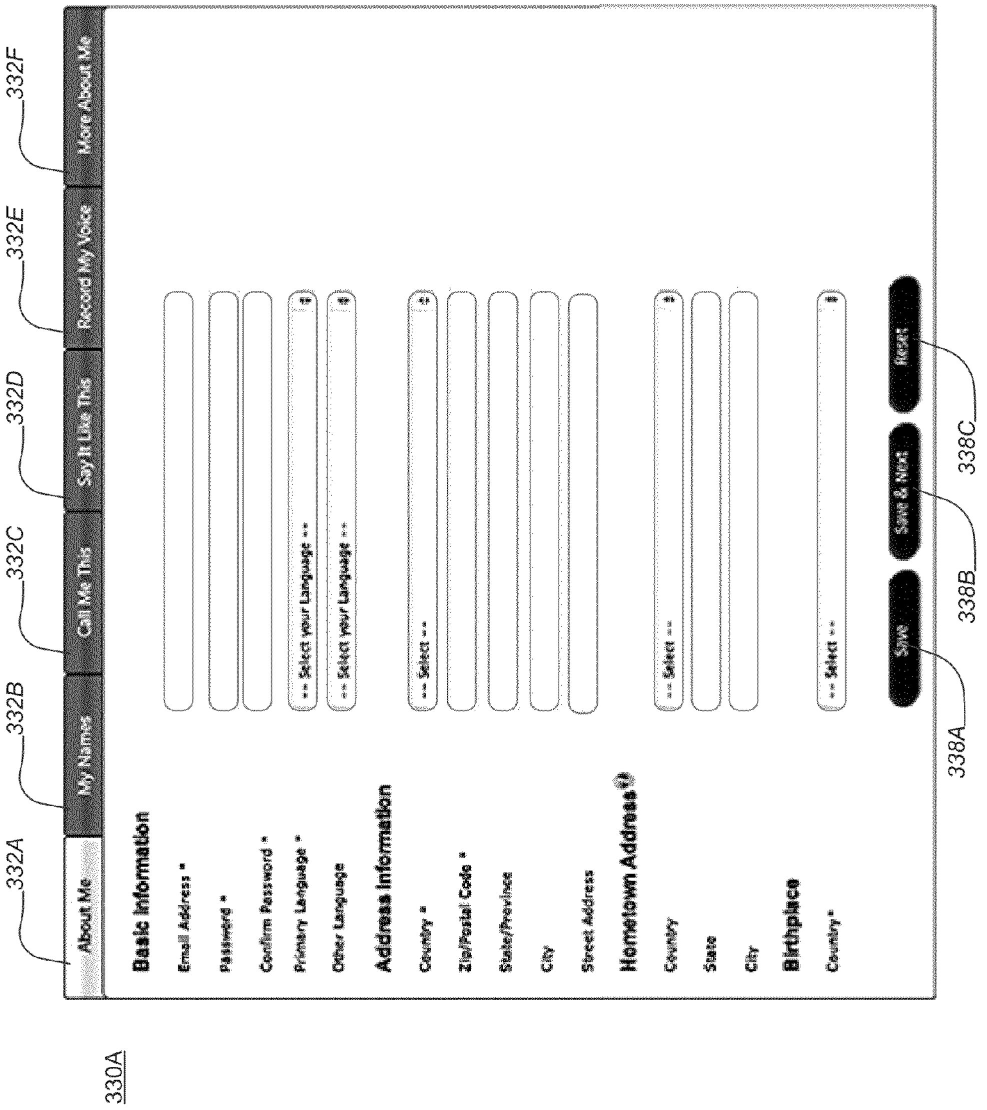
FIG. 3C shows an image of a member registration page of the website of FIG. 3A under an "About Me" tab constructed according to the principles of the disclosure.

More specifically, FIG. 3C shows a member registration page 330A of the website of FIG. 3A under the "About Me" tab 332A where the user 132 may enter basic information, address information, a home address, a birthplace and/or the like. The page 330A may include one or more text boxes, drop-down lists, and/or the like, for entering the basic information of the user 132, such as, e.g., an email address, a password for the website, the same password for confirmation, a primary language and other languages spoken by the user 132 and/or the like. The page 330A may further include one or more drop-down lists, text boxes, check boxes and/or the like, for entering and/or selecting the address information of the user 132, such as, e.g., a country, a zip/postal code, state/providence, a city, a street address and/or the like. The page 330A may further include one or more drop-down lists, text boxes, check boxes and/or the like, for entering and/or selecting the hometown information, such as, e.g., country, state, city and/or the like. The page 330A may further include one or more drop-down lists, text boxes, check boxes and/or the like, for entering and/or selecting the birthplace information, such as, e.g., country and/or the like. The page 330A may further include a "Save" button 338A, a "Save & Next" button 338B, a "Reset" button 338 and/or the like, of which the functions are known in the art, and, hence, the details thereof are omitted in this disclosure except for certain relevant details.

Figure 3D:
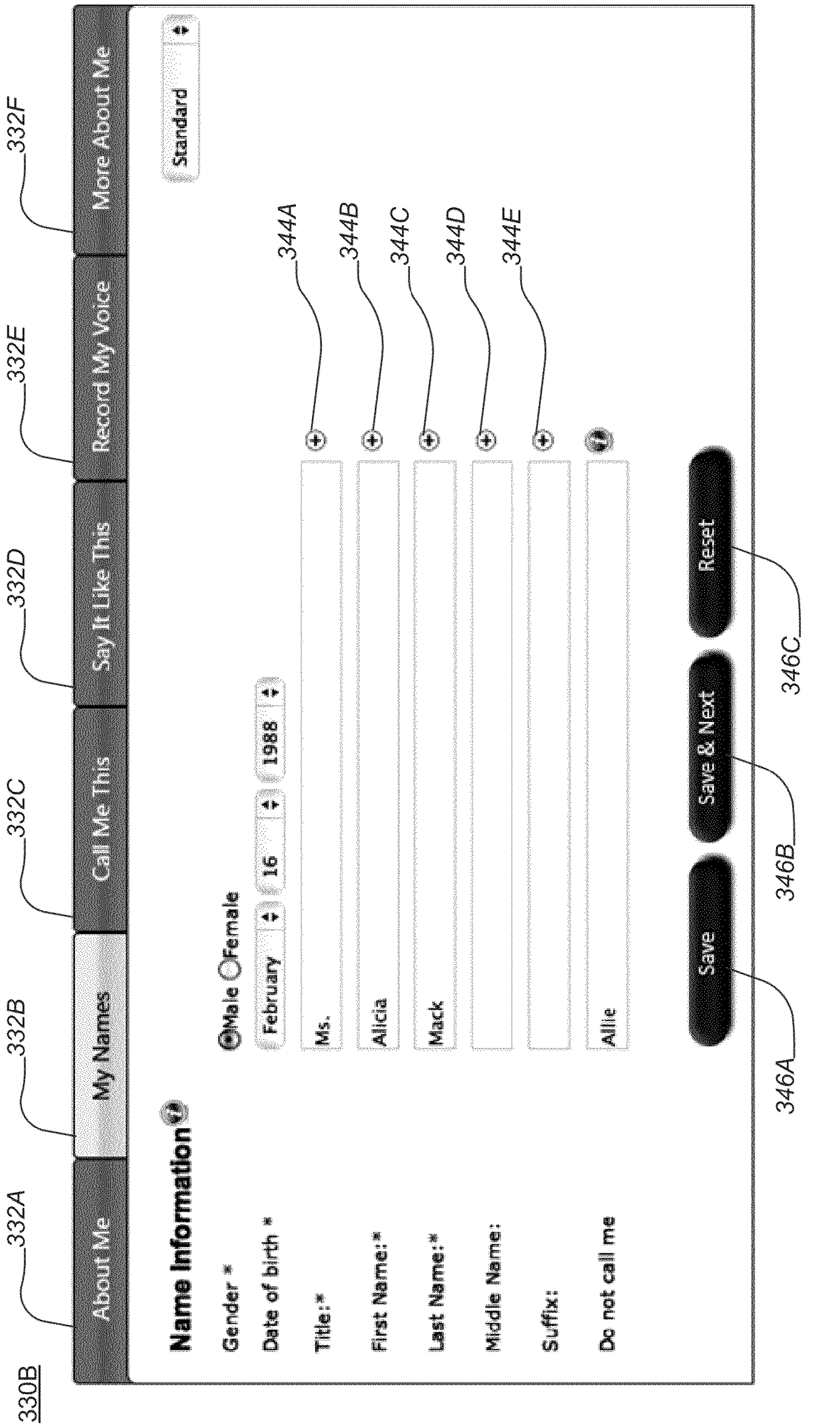
FIG. 3D shows an image of another member registration page of the website of FIG. 3A under a "My Names" tab constructed according to the principles of the disclosure.
Figure 3E:
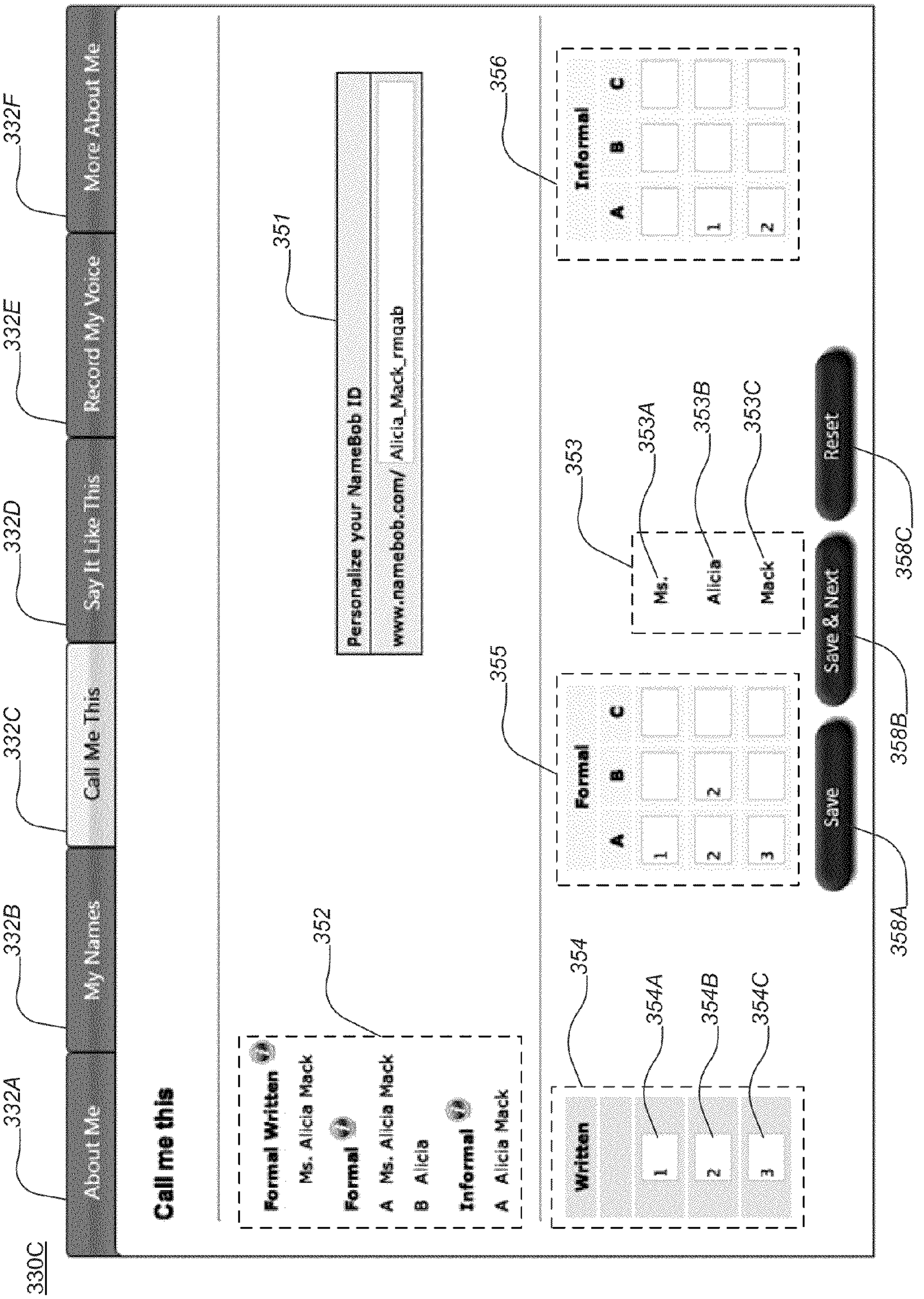
FIG. 3E shows an image of another member registration page of the website of FIG. 3A under a "Call Me This" tab constructed according to the principles of the disclosure.

Upon clicking the "Save & Next" button 338B, the user information entered by the user 132 in the page 330A may be transmitted to the service provider 110 via the communication network 120, and the next member registration page, such as, e.g., a registration page 330B under the "My Names" tab 332B shown in FIG. 3D or the like, may be displayed on the user device 130. The "My Names" page 330B may also include one or more drop-down lists, text boxes, check boxes and/or the like for entering and/or selecting the name information, such as, e.g., a gender, a date of birth, one or more titles, one or more first names, one or more last names, one or more middle names, one or more suffixes, "Do-not-call-me" name and/or the like. The "Do-not-call-me" name is a name that the user 132 does not want to be called. For example, FIG. 3D shows that the user name is Ms. Alicia Mack and her "Do-not-call-me" name is Allie.

Initially, the page 330B may show only one text box for entering the title, first name, last name, middle name, suffix and/or the like. However, if the user 132 has more than one title, the user 132 may enter the first title in the text box and click a plus button 344A to appear another text box where the user 132 may enter the second title. By clicking the plus button 344A repeatedly, the web page 330B may create as many text boxes as the user 132 needs for her or his titles. The web page 330B may further include plus buttons 344B, 344C, 344D, 344E and/or the like for entering any additional first name, last name, middle name, suffix and/or the like if necessary. Upon clicking a "Save & Next" button 346B, the name information entered in the page 330B may be transmitted to the service provider 100 and the next member registration page, such as, e.g., a registration page 330C under "Call Me This" tab 332C shown in FIG. 3E or the like, may be displayed on the user device 130.

In the "Call Me This" page 330C, the user 132 may indicate how she or he wishes her or his name to be called formally and informally. For example, based on the name information provided in the "My Names" page 330B, the "Call Me This" page 330C may display each of the previously entered title, first name, last name, middle name, suffix and/or the like in different rows in an entered name area 353. For example, for the name "Ms. Alicia Mack," which has three entries (i.e., "Ms.," "Alicia" and "Mack"), each entry may be displayed on a different row of the entered name area 353 in the conventional name order (e.g., "Ms." in the first row 353A, "Alicia" in the second row 353B and "Mack" in the third row 353C).

The "Call Me This" page 330C may further display groups of text boxes, such as, e.g., a "Written" group 354 for the formal written name, a "Formal" group 355 for the formal spoken names and an "Informal" group 356 for the informal spoken names. Each of the groups 354, 355 and 366 may include the same number of rows as the entered name area 353, and each row may include a text box where a number may be entered. A number entered in the box may indicate an order of the entry on the same row in the entered name area 353. For example, "1" entered in the first box 354A of the "Written" group 354 may indicate that the particular entry (e.g., "Ms.") in the first row 353A of the entered name area 35 is the first entry of the formal written name. When no number is entered in a box, the particular entry on the same row as the box may be eliminated from a name. Thus, to designate "Ms. Alicia Mack" as the formal written name, "1," "2" and "3" may be entered to the text boxes 354A, 354B and 354C, respectively, in the written group 354.

More than one name may be registered as the formal written name, the formal spoken name and/or the informal spoken name. For example, FIG. 3 shows two formal spoken names A ("Ms. Alicia Mack") and B ("Alicia") designated in the "Formal" group 355 and one informal spoken name A (i.e., "Alicia Mack") in the "Informal" Group 356, which are also displayed in the entered name area 353. Optionally, the "Call Me This" page 332C may further include a text be 351 where the user 132 may personalize a URL (uniform resource locator) of a web page containing the user information once a user account is created, which is also known in the art. Upon clicking a "Save & Next" button 358B, the information entered in the "Call Me This" page 330C may be transmitted to the service provider 100, and another registration page (not shown) may appear for entering name pronunciation information. The user 132 may enter the name pronunciation information, such as, e.g., sound-transcribing, International Phonetic Alphabet (IPA), language information, accent information and/or the like, for each entry of her of his name. For example, a user who registered "Ms. Alicia Mack" as her name, she may indicate how her first name "Alicia" and last name "Mack" sound like individually. Additionally or alternatively, she may indicate how her whole name "Alicia Mack" or "Ms. Alicia Mack" sounds like.

Additionally or alternatively, the service provider 110 may search the database 114 to find names and pronunciations thereof. As noted above, the service provider 100 may have more than one sound clip for a particular name because the same name may be pronounced differently in different geographic locations, languages, cultures and/or the like. Thus, the service provider 100 may retrieve all the sound clips in the database of the storage 114 that may match the searched name and send the user 132 a list of sound clips to the user device 130 for auditioning and selection by the user 132.

Figure 3F:
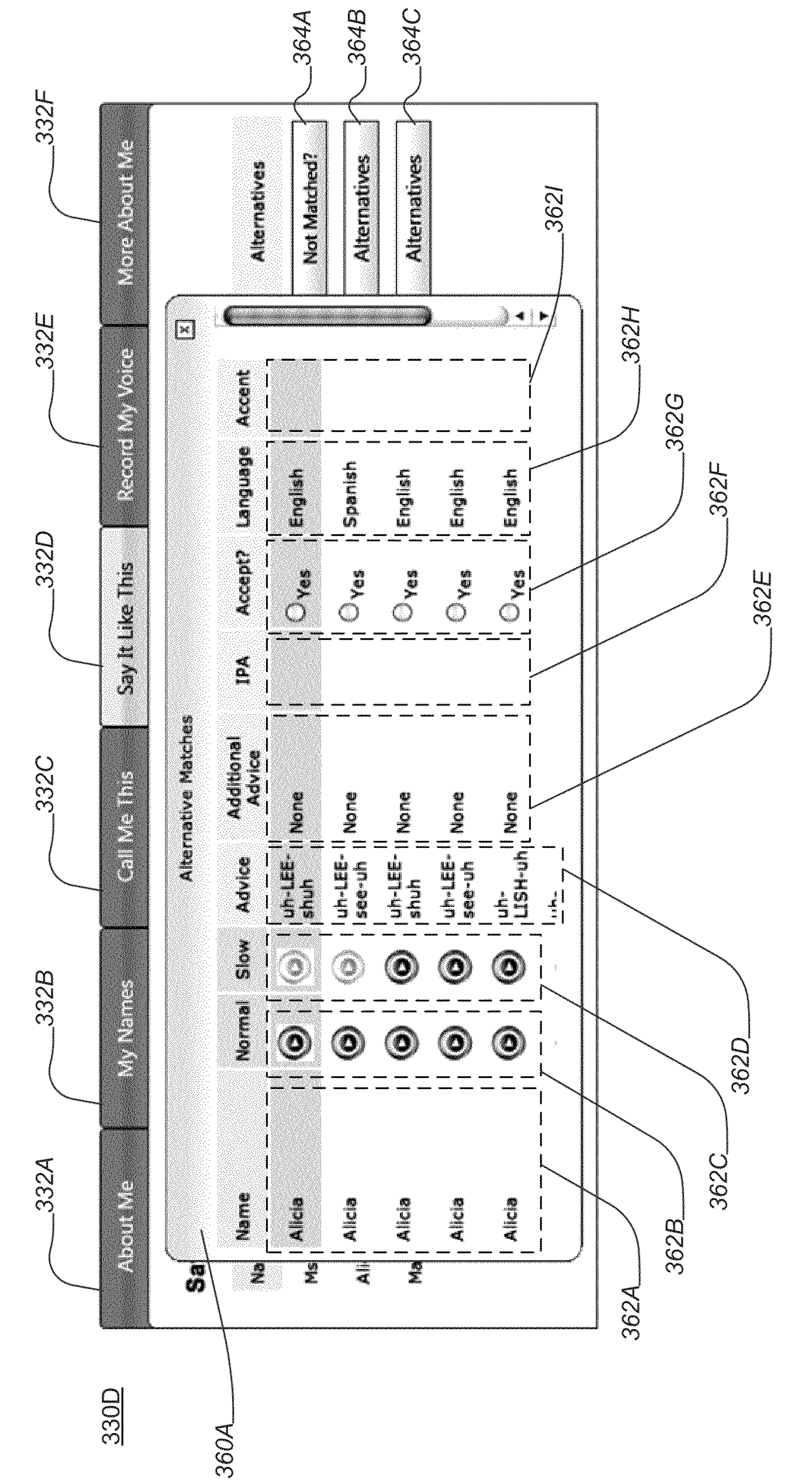
FIG. 3F shows an image of another member registration page of the website of FIG. 3A under a "Say It Like This" tab constructed according to the principles of the disclosure.
Figure 3G:
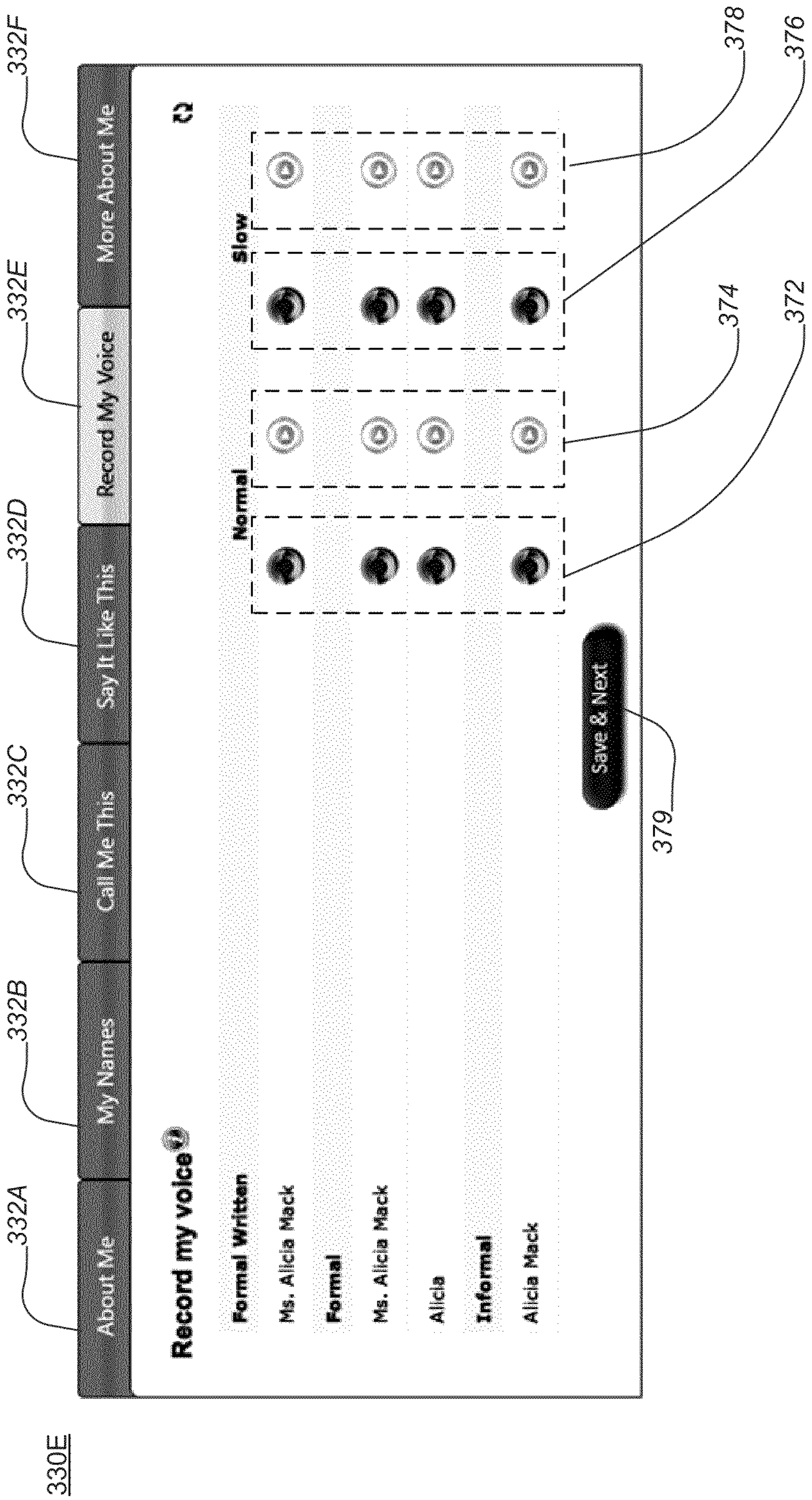
FIG. 3G shows an image of another member registration page of the website of FIG. 3A under a "Record My Voice" tab constructed according to the principles of the disclosure.

For example, FIG. 3F shows another registration page 330D under the "Say It Like This" tab 332C, in which a list of sound clips that correspond to the name of the user 132 is displayed in a window 360A. The sound clips may be played by clicking play buttons, such as, e.g., play buttons 362B and 362C, which may be linked to the sounds clips in the storage 114. Certain pronunciations of the names may include a pair of sound clips: one in a normal speed and another in a slow speed. The normal speed sound clip may be played by clicking the normal button 362B, and the slow speed sound clip may be played by clicking the normal button 362C.

The "Say Like This" page 330D may further include a name 362A, advice 362D, additional advice 362D, IPA 362F, language 362H, a list of accents 3621 and/or the like for each sound clip. The advice 362D may include phonetic transcription information, such as, e.g., "uh-LEE-shuh," "uh-LEE-see-uh," "uh-LEE-shuh," "uh-LISH-uh" and/or the like. The additional advice 362D may include a similar word that rhymes with the name and/or the like. After listening to the sound clips and/or considering the advice 362D, the additional advice 362D, the IPA 362F, the language 362H, the accent 3621 and/or the like, the user 132 may select one of the sound clips as the pronunciation of her or his name by, for example, clicking one of check boxes 362. The service provider 110 may then associate the selected sound clip to the user 132 and store the information in the storage 114. Alternatively, the user 132 may use the user device 130 to send or stream a sound clip of her or his name in her or his own voice to the service provider 110. The service provider 110 may analyze the sound clip, search the database to find names, sound clips and name pronunciation information and provide them for the user's review and approval.

When no sound clip and/or pronunciation information in the storage 114 matches the particular pronunciation searched by the user 132, she or he may click a "Not matched?" button 364A or "Alternatives" buttons 364B and 364C for other options. The "Alternatives" buttons 364B and 364C may be linked to other web pages (not shown) that list even more sounds clips of similar pronunciations that are not included in the list shown in the window 360A. The "Not matched?" button 364A may be linked to another registration page, such as, e.g., a member registration page 330E under the "Record My Voice" tab 332 shown in FIG. 3G or the like, where the user 132 may record her or his name in her or his own voice or someone else's and/or listen to the recorded voices.

The "Record My Voice" page 330E may show the name information the user 132 has provided previously, such as, e.g., the formal written name, the more formal spoken names, the informal spoken names and/or the like. Each of the user's names may be accompanied with one or more buttons, such as, e.g., a normal record button 372, a normal play button 374, a slow record button 376, a slow play button 378 and/or the like. The user 132 may click the normal record button 372 to record one of her or his names in a normal speed using, e.g., a microphone or the like installed in or connected to the user device 130. Alternatively, the user 132 may upload a pre-recorded sound file of her or his name. The recorded voice then may be converted to a digital audio file format, such as, e.g., MP3, WAV, WMA or the like, and then temporarily stored in the user device 130 or sent to the service provider 110 and stored in the storage 114.

To hear the audio file, the user 132 may click the normal play button 374. When the sound clip is not satisfactory, the user may click the normal record button 372 to record her or his name again and the unsatisfactory sound clip stored in the storage 114 may be replaced with the newly recorded sound clip. Similarly, the user 132 may click the slow record button 376 to record her or his name pronounced slowly and click the slow play button 378 to listen to the sound clip. The service provider 110 may accept sounds clips from the user 132 even if there are sound clips for the same names in the storage 114 that are professionally recorded and/or provided by other users.

Figure 3H:
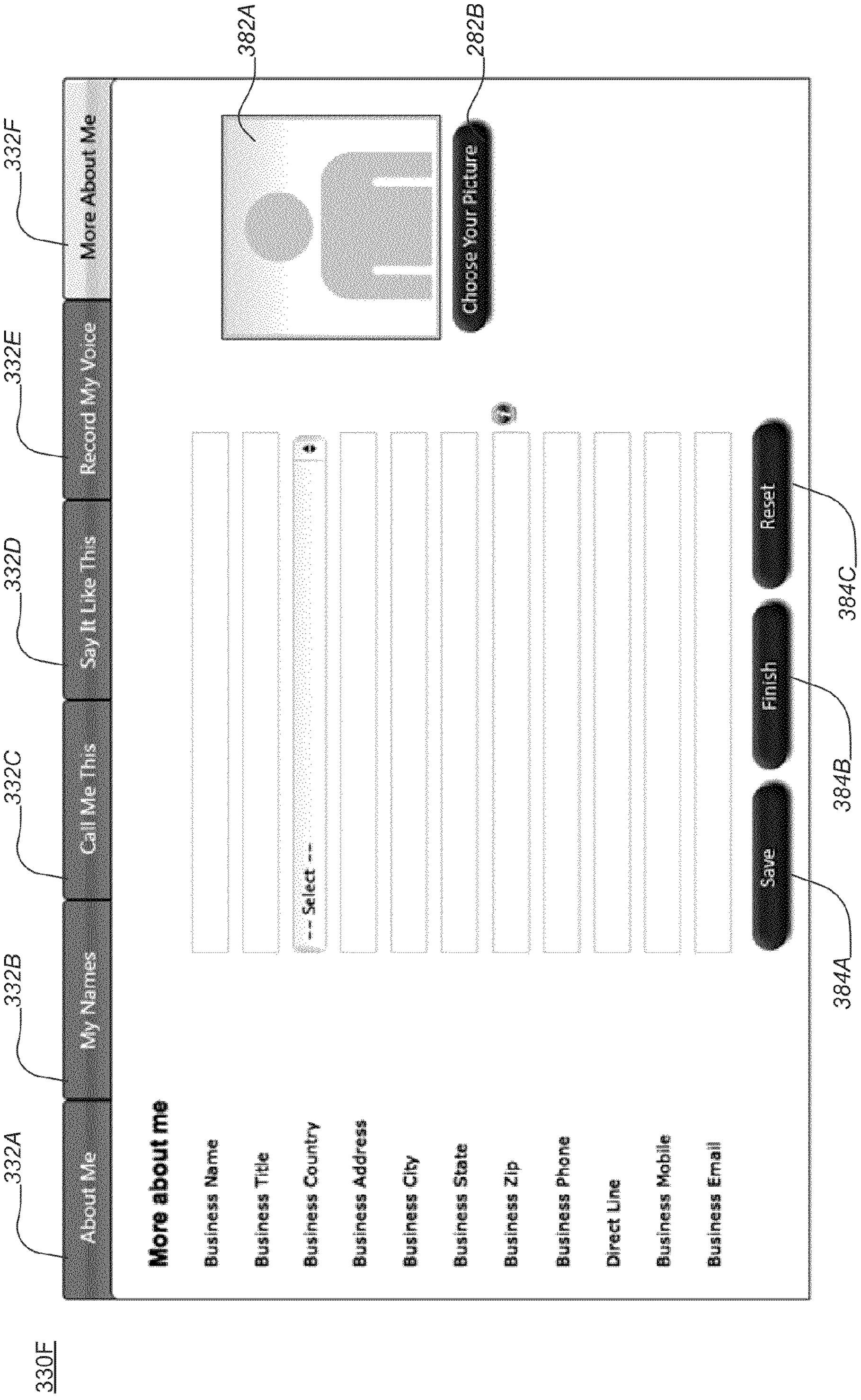
FIG. 3H shows an image of anther member registration page of the website of FIG. 3A under a "More About Me" tab constructed according to the principles of the disclosure.

In addition to the user information, name information and name pronunciation information provided to the service provider 110, the user may provide further information via another registration page, such as, e.g., a member registration page 330F under the "More About Me" tab 332F shown in FIG. 3H or the like. For example, in FIG. 3H, the "More About Me" page 330F may include one or more drop-down lists, text boxes, check boxes and/or the like, for entering and/or selecting additional information, such as, e.g., a business name, a business title, a business country, a business address, a business city, a business zip, a business phone, a direct line, a business mobile, a business email and/or the like. Further, the "More About Me" page 330F may further include a "Choose your picture" button 282B for selecting an image file in the user device 130 and upload the image to the service provider 110. The uploaded image may be display in a picture box 382A.

When the user 132 completes the registration process partially or entirely, a member account may be created for the user 132 and a member profile may be also created and stored in the storage 114. The member profile may include the information provided by the user during the registration process, including the user information, the name information, the name pronunciation information, the additional information and/or the like mentioned above. The member profile may be displayed in a web page, of which the URL may be personalized by the user 132 as noted above.

Figure 3I:
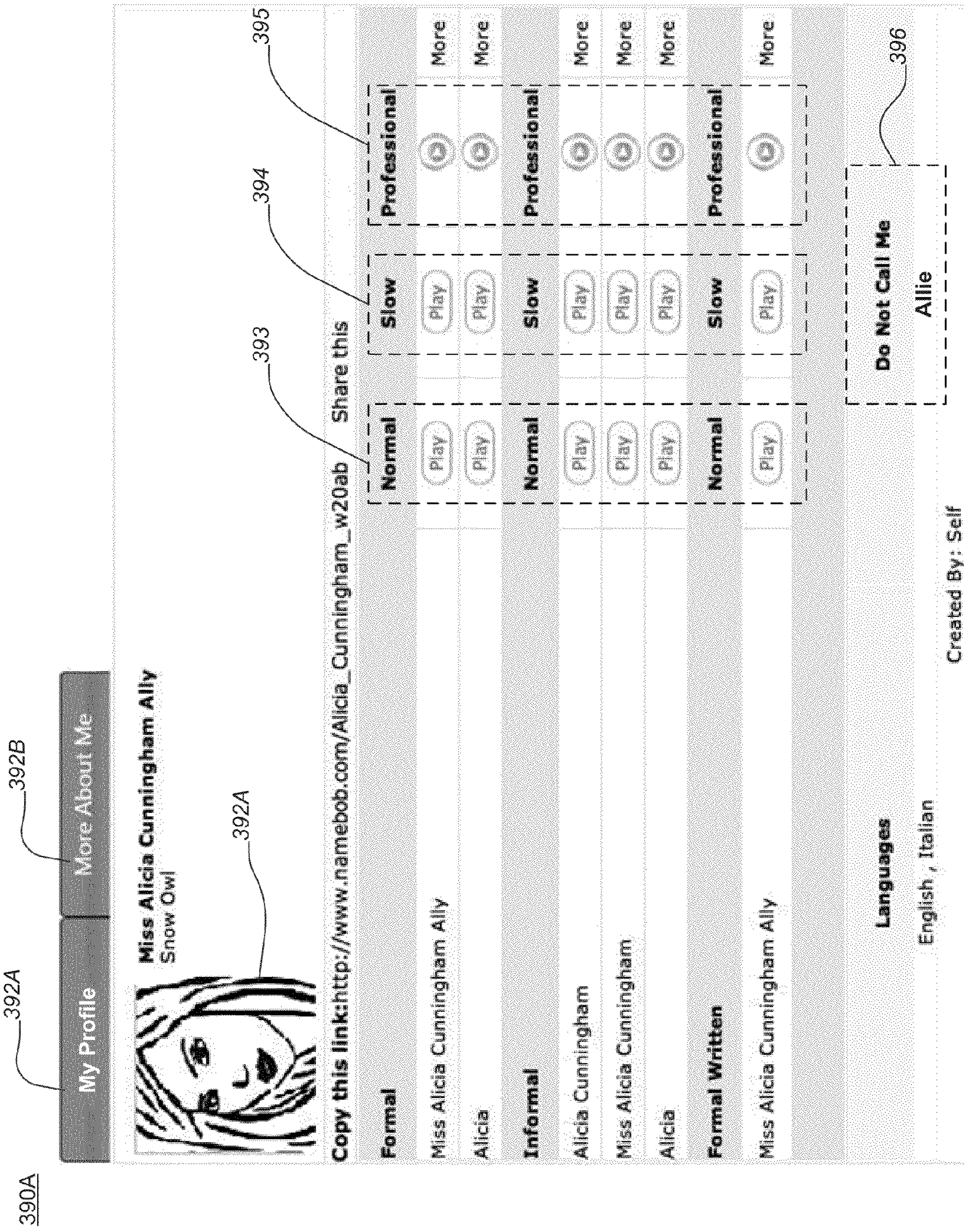
FIG. 3I shows an image of a member profile page under a "My Profile" tab constructed according to the principles of the disclosure.
Figure 3J:
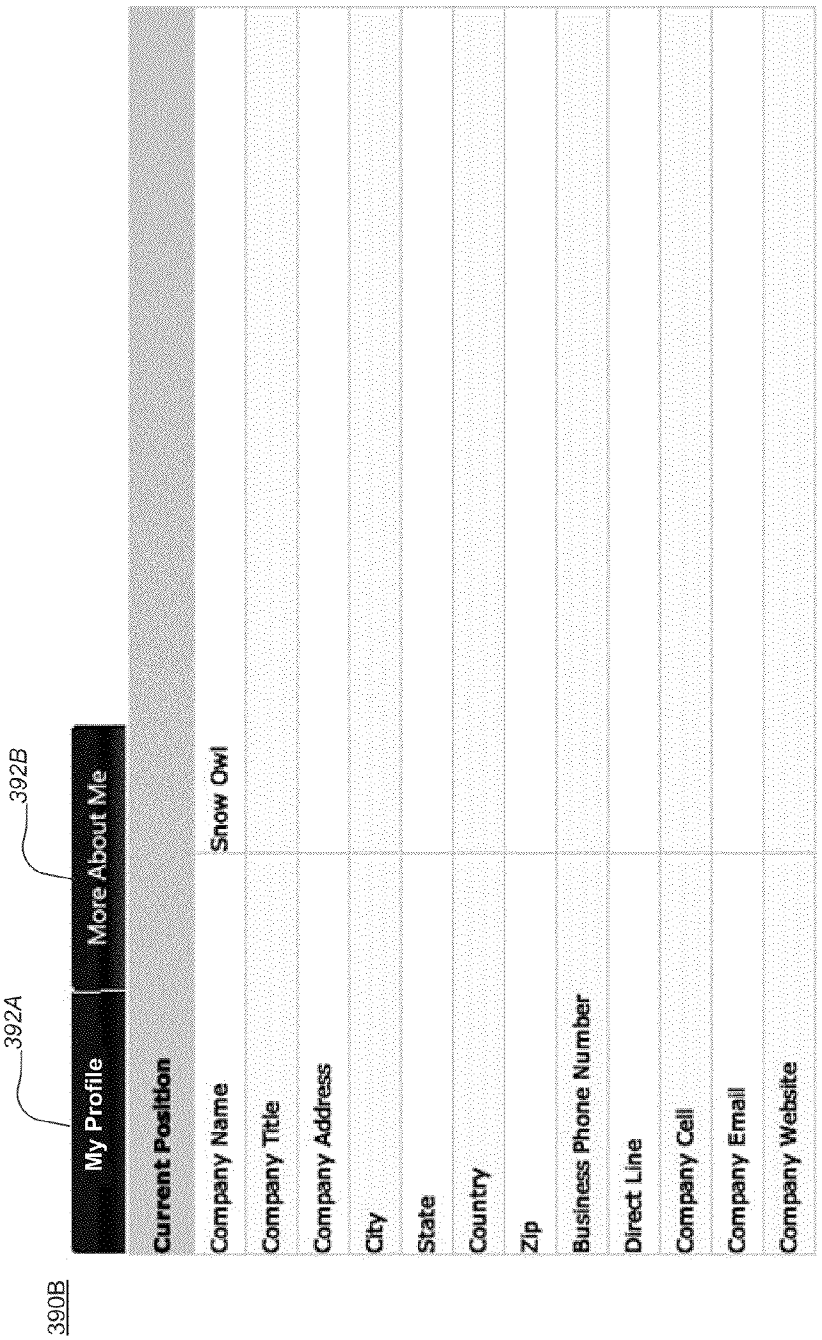
FIG. 3J shows an image of another member profile page under a "More About Me" tab constructed according to the principles of the disclosure.

For example, FIGS. 3I and 3J show a member profile page 390 having two tabs: a "My Profile" tab 392A and a "More About Me" tab 392B. FIG. 3I shows a member profile page 390A under the My Profile" tab 392A, which may display the name information of the user 132, such as, a picture 392A of the user 132, a formal written name, one or more formal spoken names, one or more informal spoken names and/or the like, the languages spoken by the user 132, a "Do Not Call Me" name and/or the like. The member profile page 390A may further include one or more play buttons to play the sound clips of each name of the user 132. The play buttons for each name may include at least one of a normal play button 393, a slow play button 394, a professional button 395 and/or the like. The normal play button 393 and the slow play button 394 may be linked to a normal speed sound clip and a slow speed sound clip, respectively, provided by the user 132. The professional button 395 may be linked to a sound clip that is recorded professionally.

FIG. 3J shows another member profile page 390B under the "More About Me" tab 392B, which may display additional information about the user 132, such as, e.g., a current position, a company name, a company title, a company address, a city, a state, a country, a zip, a business phone number, a direct line, a company cell, a company email, a company website and/or the like. The user 132 may share the URL of the member profile page 390 with others such that anyone who accesses the member profile page 390 may learn how the user 132 wants or does not want to be formally and informally called, listen to the sound clips, learn about the personal and professional information and/or the like.

Figure 4:
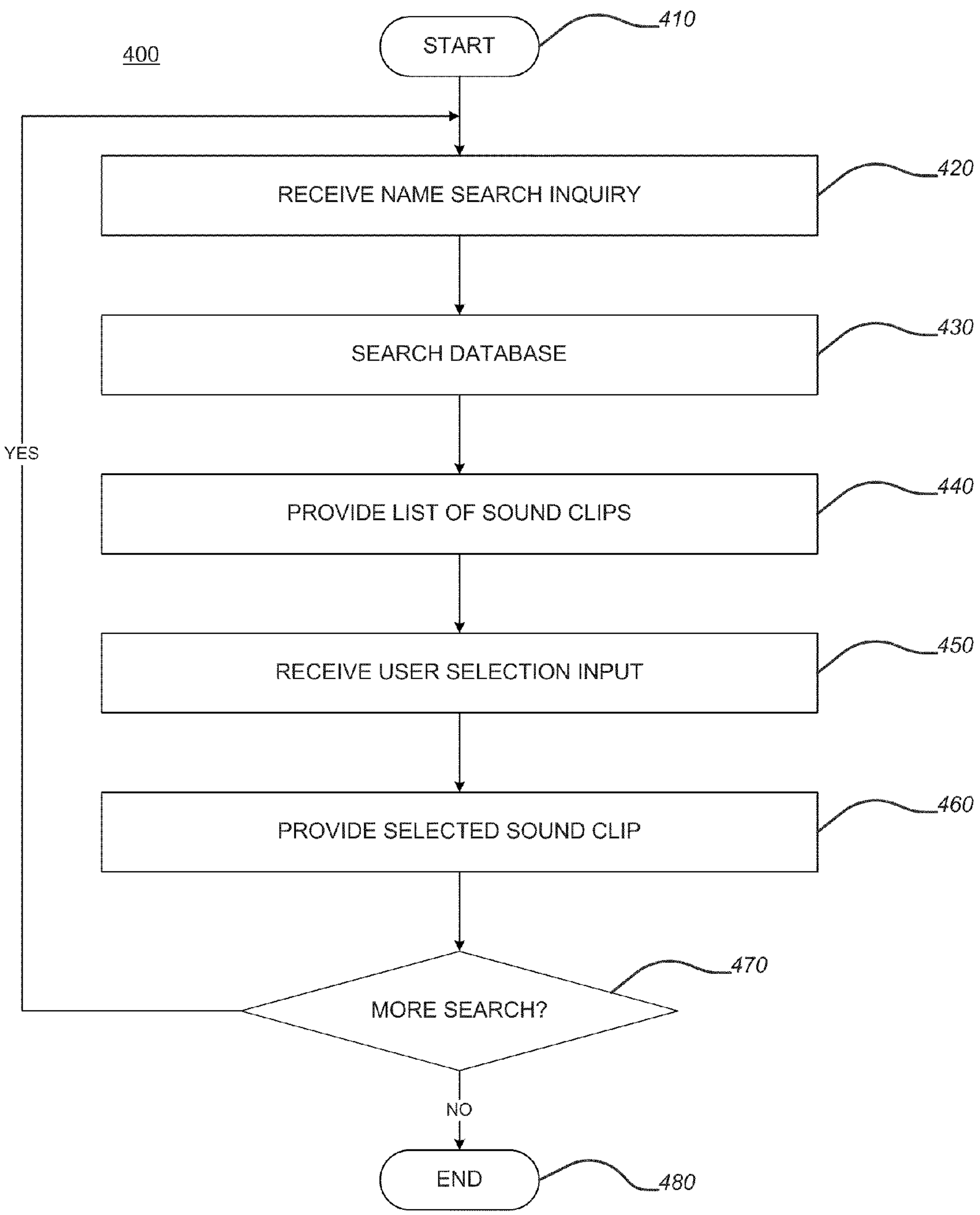
FIG. 4 shows a flowchart of a process for providing name pronunciation guide services according to the principles of the disclosure.
Figure 5A:
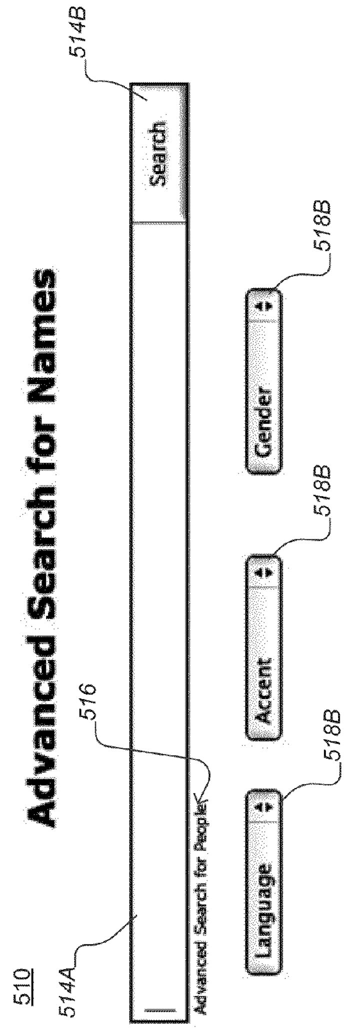
FIG. 5A shows an image of an advanced search for names page of the website of FIG. 3A constructed according to the principles of the disclosure.
Figure 5B:
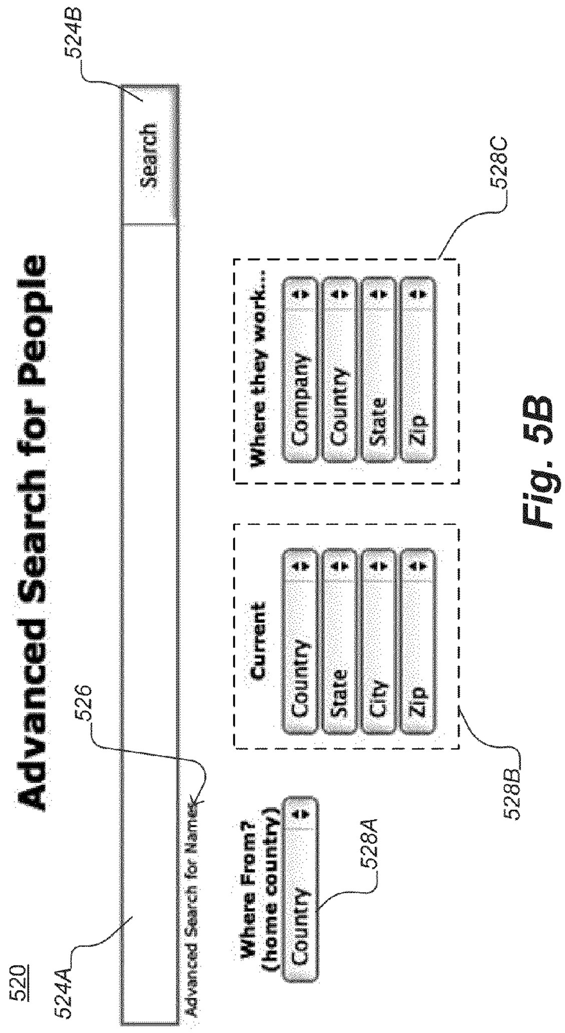
FIG. 5B shows an image of an advanced search for people page of the website of FIG. 3A constructed according to the principles of the disclosure.

FIG. 4 shows a flowchart of a process 400 for providing name pronunciation guide services according to the principles of the disclosure. Similar to the process 200 shown in FIG. 2, the process 400 may be web-based and carried out by the system 100 shown in FIG. 1 and/or the like. Thus, the service provider 110 may provide the name pronunciation guide services via a website to any visitors from anywhere anytime regardless of whether a particular visitor is a registered member of the website or not. However, the service provider 110 may be configured to limit what a non-registered member may and may not do while she or he is visiting the website. Upon starting the process 400 (at 410), the service provider 110 may receive an inquiry to search a name from a user 132 (at 420) using a user device 130 connected to the network 120. The user 132 may be a registered member or a non-registered member of the website. Based on the search inquiry, the service provider 110 may search the database in the storage 114 (at 430) to find a list of sound clips in the database that correspond to the inquired name. Upon completing the search (at 430), the service provider 110 may provide the list of sound clips in the storage 114 that match the inquired name (at 440) to the user device 130 via the network 120 for auditioning and selection by the user 132. The user 132 may then select one of the sound clips in the list using the user device 130, and the service provider 110 may receive the user selection input from the user device 130 via the network 120 (at 460). In response to the user selection input, the service provider 110 ma provide the selected sound clip to the user device 130 (at 460) via the network. The user 132 may listen to the sound clip and learn how to pronounce the name he or she has inquired at 420. If the user 132 wants another name search (YES at 470), the process may loop back to receiving another name search inquiry (at 420). If the user 132 does not want any more name searches (NO at 470), the process 400 may terminate (at 480).

For example, when the user 132 wants to learn how to pronounce a certain name, the user 132 may visit the website, such as, e.g., the home page 310 shown in FIG. 3A or the like, where the user 132 may submit a name search inquiry by entering the name in the text box 316A and clicking the "Search" button 316B. For a more detailed name search, the user 132 may click the "Advanced Search for Name" link 318B, which may be linked to another website, such as, e.g., a web page 510 shown in FIG. 5A or the like, where the user may enter one or more additional search terms to narrow down the search. For example, the web page 510 may include a text box 514 for entering a name to be searched, one or more drop-down lists 518B, text boxes, checkboxes and/or the like for entering additional search categories, such as, e.g., a language, accent, gender and/or the like of the name. When the user 132 clicks the "Search" button 514B, the name and/or the additional search categories may be sent from the user device 130 to the service provider 110 via the network 120.

Upon receiving the name search inquiry from the user 132, the service provider 110 may search the database based on the name and/or the additional search categories to find one or more sound clips corresponding to the inquired name. The additional search categories may help the service provider 110 search the database more quickly and provide fewer sound clips that are more relevant to the user's search more promptly. Once the search is completed, the service provider 110 may provide a list of sound clips that match the inquired name and, if any, the additional search categories. The list may be displayed in a web page, such as, e.g., a web page 550 shown in FIG. 5E or the like. For example, the web page 550 includes a list of sound clips for the name "Alicia." The web page 550 may include a plurality of "Play" buttons 552 that are linked to the sound clips. The web page 550 may further show a language, a country, advice, an additional advice, a gender and a type of each sound clip. When no exact match is found in the database, the service provider 110 may search and display a list of best guess results.

The storage 114 may include a normal speed sound clip and a slow speed sound clip for certain names. Thus, the "Play" buttons 552 may include buttons linked to normal speed sound clips and buttons linked to slow speed sound clips. Certain name may be provided with both the normal speed button and the slow speed button while other names may be provided only one thereof. Furthermore, the web page 550 may include a "Practice" button 554 for each name pronunciation. More specifically, after playing a sound clip of a certain name by, e.g., clicking the "Play" button 552 to hear how the name is pronounced, the user 132 may click the "Practice" button 554 to record her or his pronunciation of the name. Then, the recorded voice may be converted to a digital file format by the user device 130 and sent to the service provider 110 for analysis and comparison. When the recorded voice is not within an acceptable range, the service provider 110 may notify the user 132 as to whether her or his pronunciation of the name is correct or not. With more sophisticated voice recognition technologies, the service provider 110 may also provide the problems with the user's pronunciation and an advice on how to correct the pronunciation.

In addition to providing the name pronunciation guide services, the system 100 shown in FIG. 1 may also provide people search services. More specifically, when a number of users 132 become registered by, e.g., the process 200 shown in FIG. 2 or the like, a substantial amount of member data may be stored in the storage 114. More member data may be added to the database as more members are registered. Thus, the service provider 110 may be configured to search a member and provide their profile with guides on how to pronounce their name. For example, a visitor may enter a name of a person to be searched in the text box 316A and click the "Search" button 316B to find the person's profile. Additionally, the home page 310 may include an "Advanced Search for People" link 318, which may be linked to another web page, such as, e.g., a web page 520 shown in FIG. 5B or the like, where the visitor may enter and/or select more search categories. For example, the web page 520 may include one or more drop-down lists (e.g., drop-down lists 528A, 528B and 528C), text boxes, checkboxes and/or the like, to enter additional search categories, such as, e.g., a country of origin, current location information (e.g., a country, state, city, zip and/or the like), business information (e.g., a business name, country, state, zip and/or the like) and/or the like.

Based on the person's name and/or the additional information, the service provider 110 may search the database and provide a list of members that match the search terms and categories. When no match is found, the service provider 100 may display "best guess" results. For example, FIG. 5C shows a web page 530 displaying a list of members that match the search term "Alicia Cunningham." The list may further include, a picture (if available), member ID, company name, language, country, work country, work state, work city, home country and/or the like. It may not necessary to know a full name to search a person. The service provider 110 may be able to search based on one of the first and last names. In fact, the person search may be conducted based on any piece of information in the database. For example, when the visitor knows only the first name "Alicia" of the person to be searched, the service provider 110 may search the database and provide list of the members having the same first name as shown in a web page 540 in FIG. 5D. Then, the visitor may review each member's profile and picture shown in the web pages 530 and 540 and select the name in the list. Each name listed in the web pages 530 and 540 may be linked to a particular member's member profile page 390 shown in FIGS. 3I and 3J, where the visitor may learn the member's formal written name, formal spoken names, informal spoken names, "do not call me" names and/or the like, listen to the sound clips to learn how to correctly pronounce their name, learn more personal and professional information about the member, and/or the like.

Accordingly, business entities, such as, e.g., call centers, banks, hotels, sales department and/or the like may benefit from learning how to correctly pronounce current or potential customers' names and knowing more about them. Further, for businesses, organizations, schools, governments and/or the like, the system 100 may be implemented in an exclusive manner, via the Internet, cloud computing or a combination thereof in order to ensure confidentiality, competitive advantage and/or the like. More specifically, those entities may independently operate all or some of the services described above exclusively or the system 100 may reserve certain resources to provide the services exclusively to those entities via secured communication channels.

The services provided by the system 100 may extend to geographical names, business/organization names, product names (e.g., wine names, food names) and the like. Additionally, the system 100 may be configured to process tonal languages, such as, e.g., Mandarin, Vietnamese and the like and non-Romanized languages, such as, e.g., Chinese, Japanese, Korean and the like. Further, the website may be converted from one language to another language by simply selecting a different language as known in the art. The system 100 may be further configured such that, when a different language is selected by a user, certain contents may also be automatically updated with new contents that are more suitable for the selected language. For example, in FIG. 3F, when a user selects Mandarin as the system language, the advice 362D and additional advice 362E that were originally intended for English-spoken users may be replaced with contents suitable for Mandarin-speaking users.

Furthermore, the services provided by the system 100 may be linked to social networks services and business contact management services, such as, e.g., Facebook™, Tweeter™, Myspace™, LinkedIn™, Eharmony™ Plaxo™ and the like. Additionally, the functionalities of the services provided by the system 100 may be implemented as an application, plug-in, add-on and the like for business productive suites, such as, e.g., Microsoft Office™, Wordperfect Office™, Openoffice™ and the like. For example, the services may be implemented as a smartphone app (application) for contact management for creating and modifying contact profiles. During or after a meeting with a client, a user may use her or his smartphone to create a new contact profile or modify the existing contact profile of the client. The contact profile may be synced with the service provider. The user may use the smartphone to record the client name, which may be added to the client's contact profile. The contact profile may be similar to the member profile noted above. However, the contact profile may be created, modified and deleted only by the user.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A method for providing a name pronunciation guide, comprising:

storing a plurality of audio files in a database, each audio file representing a particular pronunciation of one of a plurality of names;

receiving user information from a first user via a communication network, the user information including name information of the first user;

searching the database to find one or more audio files corresponding to the name information;

providing the first user with one or more audio files in the database corresponding to the name information via the communication network for the first user's listening and selection;

creating a user profile for the first user, the user profile comprising the user information and the selected audio file;

storing the user profile in the database;

receiving an inquiry for searching a name of the first user from a second user via the communication network;

searching the database for one or more user profiles corresponding to the searched name; and providing to the second user a display of the one or more user profiles corresponding to the searched name via the communication network, wherein the display includes a link to one or more audio files associated with the one or more user profiles, wherein the name information comprises one or more call-me-this names.

2. The method of claim 1, wherein the user information further comprises at least basic information, address information, hometown information and birthplace information, wherein the basic information comprises at least one of an email address, a primary language and other languages spoken by the first user, wherein the address information comprises at least one of a street address, a city, a state/providence, a zip/postal code and a country, wherein the hometown information comprises at least one of a country, a state/providence and a city, and wherein the birthplace information comprises a country.

3. The method of claim 1, wherein the one or more call-me-this names comprise at least one of a formal written name, a formal spoken name and an informal spoken name.

4. The method of claim 3, wherein the name information further comprises at least one of a gender, a date of birth, a title, a middle name, a suffix and one or more do-not-call-me names.

5. The method of claim 4, further comprising storing, in the database, at least a normal speed audio file and a slow speed audio file representing a particular pronunciation of at least some of the plurality of names.

6. The method of claim 5, further comprising storing, in the database, at least one of pronunciation advice information, an international phonetic alphabet (IPA) transcription, language information and accent information of at least some of the plurality of audio files.

7. The method of claim 6, further comprises receiving one or more user audio files representing a particular pronunciation of the first users name from the first user when the particular pronunciation of the first user's name is not available in the database.

8. The method of claim 7, wherein the one or more user audio files comprise at least a normal speed audio file and a slow speed audio file for at least one of the call-me-this names.

9. The method of claim 7, further comprising publishing the user profile of the first user on a searchable location of the communication network, the published user profile comprising at least:

a normal speed audio the and a slow speed audio file of at least one of the call-me-this names of the first user;

the do-not-call-me name of the first user; and the language spoken by the first user.

10. The method of claim 9, further comprising:

receiving a practice audio file from the second user via the communication network, the practice audio file representing the second user's pronunciation of the searched name;

analyzing the practice audio file to determine whether the second user's pronunciation of the searched name is correct or not; and providing a feedback to the second user as to whether the second user's pronunciation of the searched name is correct or not via the communication network.

11. A name pronunciation guide system, comprising:

a server connected to a communication network and operating a database storing a plurality of audio files, each audio file representing a particular pronunciation of one of a plurality of names; and a first user device connected to the server via the communication network and configured to receive user information from a first user and send the user information to the server, the user information including name information of the first user, wherein, in response to the user information received from the first user device, the server is configured to search the database to find one or more audio files corresponding the name information, send one or more audio files corresponding to the name information to the first user device via the communication network for the first user's listening and selection, creating a user profile for the first user and store the user profile in the database, the user profile comprising the user information and the selected audio file, wherein the server is further configured to receive an inquiry for searching a name of the first user from a second user device of a second user via the communication network, search the database to find one or more user profiles corresponding to the searched name, and send one or more audio files corresponding to the one or more user profiles to the second user device via the communication network, wherein the name information comprises one or more call-me-this names.

12. The system of claim 11, wherein the user information further comprises at least basic information, address information, hometown information and birthplace information, wherein the basic information comprises at least one of an email address, a primary language and other languages spoken by the first user, wherein the address information comprises at least one of a street address, a city, a state/providence, a zip/postal code and a country, wherein the hometown information comprises at least one of a country, a state/providence and a city, and wherein the birthplace information comprises a country.

13. The system of claim 11, wherein the one or more call-me-this names comprise at least one of a formal written name, a formal spoken name and an informal spoken name of the first user, wherein the name information further comprises at least one of a gender, a date of birth, a title, a middle name, a suffix and one or more do-not-call-me names.

14. The system of claim 13, wherein the database comprises:

at least a normal speed audio file and a slow speed audio file representing a particular pronunciation of at least some of the plurality of names; and at least one of pronunciation advice information, an international phonetic alphabet (IPA) transcription, language information and accent information of a particular pronunciation of at least some of the plurality of names.

15. The system of claim 14, wherein the server is further configured to receive one or more user audio files representing a pronunciation by the first user of the first users name from the first user device when the particular pronunciation of the first user's name is not available in the database.

16. The system of claim 15, wherein the user profile of the first user is published on a searchable location of the communication network, the published user profile comprising at least:

a do-not-call-me name of the first user; and a language spoken by the first user.

17. The system of claim 11, wherein the server is further configured to receive a practice audio file from the second user device via the communication network, the practice audio file representing the second user's pronunciation of the searched name, analyze the practice audio file to determine whether the second user's pronunciation of the searched name is correct or not, and provide a feedback to the second user device as to whether the second user's pronunciation of the searched name is correct or not via the communication network.

18. The system of claim 11, wherein the first user device and the second user device are one of a desktop computer, a laptop computer, a tablet computer, a personal data assistant (PDA) and a mobile phone.

19. A method for providing a name pronunciation guide, comprising:

storing a plurality of audio files in a database, a number of the plurality of audio files representing different pronunciations of one of a plurality of names;

receiving user information from a first user via a communication network, the user information including first name information and last name information of the first user;

searching the database to find one or more audio files corresponding to at least one of the first name information and second name information of the first user;

providing the first user with a plurality of audio files in the database corresponding to at least one of the first name information and second name information of the first user via the communication network for the first user's listening and selection;

creating a user profile for the first user, the user profile comprising the first name information, the second name information, and the selected audio file, wherein the selected audio file comprises a desired pronunciation of at least one of the first name information and second name information of the first user;

storing the user profile in the database;

receiving an inquiry for searching the first name information and the second name information of the first user from a second user via the communication network;

searching the database for one or more user profiles corresponding to the first name information and second name information; and providing to the second user a display of the user profile corresponding to the first user via the communication network, wherein the display includes a link to the selected audio file that comprises the desired pronunciation of at least one of the first name information and second name information of the first user.

20. The method of claim 1, wherein the storing comprises storing a number of the plurality of audio files representing different pronunciations of one of the plurality of names.

21. The method of claim 1, wherein the one or more audio files is professionally recorded.

22. The system of claim 11, wherein the one or more audio files is professionally recorded.

* * * * *